United States Patent
Lin et al.

(10) Patent No.: US 7,620,172 B2
(45) Date of Patent: Nov. 17, 2009

(54) METHOD AND SYSTEM FOR ELIMINATING NOISES AND ECHO IN VOICE SIGNALS

(75) Inventors: Zhongsong Lin, Beijing (CN); David Xiao D. Yang, Beijing (CN); Zhonghan Deng, Beijing (CN)

(73) Assignee: Vimicro Corporation, Beijing (CN)

( * ) Notice: Subject to any disclaimer, the term of this patent is extended or adjusted under 35 U.S.C. 154(b) by 807 days.

(21) Appl. No.: 11/304,139

(22) Filed: Dec. 14, 2005

(65) Prior Publication Data

US 2007/0036344 A1    Feb. 15, 2007

(30) Foreign Application Priority Data

Jul. 15, 2005   (CN)  ......................... 2005 1 0084210

(51) Int. Cl.
    *H04M 9/08*    (2006.01)
(52) U.S. Cl. ................. 379/406.08; 379/3; 379/406.02; 379/406.05
(58) Field of Classification Search ................. 379/406.01–406.08, 3, 410
    See application file for complete search history.

(56) References Cited

U.S. PATENT DOCUMENTS

| 6,549,627 B1 * | 4/2003 | Rasmusson et al. ...... 381/71.11 |
| 6,842,516 B1 * | 1/2005 | Armbruster ............ 379/390.02 |

* cited by examiner

*Primary Examiner*—Fan Tsang
*Assistant Examiner*—Akelaw A Teshale
(74) *Attorney, Agent, or Firm*—Joe Zheng

(57) ABSTRACT

Techniques for simultaneously and efficiently eliminating echo and noise mixed in voice are disclosed. According to one aspect of the present invention, an adaptive filter system for eliminating noises and echo mixed in voice signal comprises a first signal adaptive filter, a first subtractor, a second adaptive filter and a second subtractor. The first signal adaptive filter estimates the noise mixed in the voice signal according to a reference noise. The first subtractor subtracts the noise estimated by the first adaptive filter from the voice signal to obtain a voice signal without the mixed noise. The second adaptive filter estimates the echo mixed in the voice signal according to a remote voice signal. The second subtractor subtracts the echo estimated by the second adaptive filter from the voice signal without mixed noise to obtain a clean voice signal.

11 Claims, 4 Drawing Sheets

METHOD AND SYSTEM FOR ELIMINATING NOISES AND ECHO IN VOICE SIGNALS

BACKGROUND OF THE INVENTION

1. Field of the Invention

The present invention relates to voice signal processing, and more particularly to method and system for eliminating noises including echo mixed in voice signal via adaptive filters.

2. Description of Related Art

Both noise and echo eliminations are important problems in the subject of signal processing. The research on these problems started when the signal processing came into being. It is still one of the research hot spots in signal processing. During the voice transmission and processing, various noises and echo are mainly caused by these reasons. First, there is a noise source adjacent to a voice source. If a pair of microphones A and B is adapted to record the voice source, wherein the microphone A is near to the voice source and far from the noise source, and while the microphone B is near to the noise source and far from the voice source. In this condition, a double track voice signal could be recorded. However, both the microphones A and B simultaneously produce noises due to the existence of the noise source, which adversely affects the tone of the double track voice signal. It should be noted that the two adjacent voice source and noise source are taken as the example. In reality, various voice sources and noise sources coexist, in which the influence of the noise sources on the voice will become more serious.

The echo is a problem that is often experienced by a real-time teleconference. In the real-time teleconference, a local voice at location A is received by a remote receiver after a certain period delay, and then played by a remote speaker as an echo of the local voice A. At the same time, a remote voice at location B tries to make conversations with location A, the remote voice at location B together with the echo of the voice from location A are recorded at the same time and transmitted to location A. Thus when the voice from location B is reproduced, in addition to the remote voice from location B, the original local voice from location A is also heard. Such a phenomenon is called echo phenomenon which also adversely affects the tone of the voice signal.

It is important to reduce or eliminate the noise and the echo in voice processing. Usually the noise and echo in voice signals can be reduced or eliminated by adaptive filters. FIG. 1 shows an example of filtering out noise and echo. It is assumed that the voice mixed with the noise which is recorded by microphone A is transmitted via Channel A and a reference noise which is recorded by the microphone B is transmitted via Channel B. In accordance with FIG. 1, an adaptive filter 11 estimates the noise mixed in the voice according to the reference noise in the Channel B. Then, by a subtractor 12, the noise estimated by the adaptive filter 11 is subtracted from the voice with mixed noise in Channel A to obtain a clean voice. Finally, the clean voice is provided to the adaptive filter 11 as a feedback signal. Thus, it can improve a signal-noise ratio of the voice mixed with the noise.

FIG. 2 shows another example of filtering out noise and echo. It is assumed that a speaker A's voice is mixed with an echo of a speaker B's voice. In accordance with FIG. 2, an adaptive filter 21 estimates a possible echo in the speaker A's voice according to the speaker B' voice. A subtractor 22 is provided to subtract the echo estimated by the adaptive filter 21 from the speaker A's voice mixed with the echo to get a clean voice signal. Finally, the clean voice is provided to the adaptive filter 21 as the feedback signal, thus it can reduce or eliminate the echo influence on the real-time teleconference.

The conventional adaptive filter is typically implemented using Least Mean Square algorithm (LMS) and Recursive Least Square algorithm (RLS). When the adaptive filter is of N order, the computation quantity of the LMS algorithm is O(N) (i.e., a theoretical measure of the execution of an algorithm in the art), while the computation quantity of the RLS algorithm is O(N*N). The computation quantity and memory requirements of the LMS algorithm are very small, which leads it to become a very popular algorithm in DSP. The frequently used algorithm among the LMS algorithms is the NLMS algorithm (Normalized Least Mean Square) which includes time domain NLMS sub-band NLMS and frequency domain NLMS.

As shown in FIG. 3, the LMS algorithm has two inputs, Signal X and Signal Y. The Signal X is a reference noise and/or a remote speaker's voice signal, and Signal Y is the voice signal with the noise and/or the echo. The LMS algorithm is summarized as follows:

$$E[n] = Y[n] - \sum_{i=0}^{N-1} w_i * X[n-i] \qquad (1)$$

where the E[n] indicates the factual output signal vector at n time of day, Y[n] indicates the voice with the noise or echo vector at n time of day, X [n−i] indicates the noise or echo vector at n−1 time of day, Wi indicates the i order coefficient vector of the adaptive filter, and N indicates the order number of the adaptive filter.

However, it is noticed that there are several problems in the conventional methods for eliminating noise and echo mixed in voice signal via adaptive filters. Only one adaptive filter and one reference sound source can not simultaneously resolve the problem of noise elimination and echo elimination. In order to simultaneously eliminate the noise and echo, two adaptive filters and two reference sound sources are needed. Additionally, the order number of the echo elimination filter is higher than the order number of the noise elimination filter.

If connecting the adaptive filters in serial and putting the echo elimination filter before the noise elimination filter, which may lead to echo existence in the reference noise, the ultimate output will encompass the echoing similar to the reverberation.

Thus there is a need for techniques for simultaneously and efficiently eliminating echo and noise mixed in voice signals.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to techniques for simultaneously and efficiently eliminating noises and echo mixed in voice. According to one aspect of the present invention, an adaptive filter system for eliminating noises and echo mixed in voice signal comprises a first signal adaptive filter, a first subtractor, a second adaptive filter and a second subtractor. The first signal adaptive filter estimates the noise mixed in the voice signal according to a reference noise. The first subtractor subtracts the noise estimated by the first adaptive filter from the voice signal to obtain the voice signal without the mixed noise. The second adaptive filter estimates the echo mixed in the voice signal according to a remote voice signal which causes the echo in the voice signal. The second subtractor subtracts the echo estimated by the second adaptive filter from the voice signal without the mixed noise to recover a clean voice signal.

The present invention may be implemented as a circuit, a process and a method. According to one embodiment, the present is a method for eliminating echo and noise mixed in voice signal, the method comprises: estimating, by a first adaptive filter, the noise in the voice signal according to coefficients of the first adaptive filter and a reference noise; subtracting the noise estimated by the first adaptive filter from the voice signal to obtain a processed voice signal with the noise removed; updating the coefficients of the first adaptive filter in accordance with the processed voice signal; estimating, by a second adaptive filter, the echo in the voice signal according to coefficients of the second adaptive filter and a remote voice; subtracting the echo estimated by the second adaptive filter from the processed voice signal to obtain a clean voice; and updating the coefficients of the second adaptive filter in accordance with the clean voice.

One of the objects, features, and advantages of the present invention is to provide solutions to remove noise and echo in voice signals.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The detailed description of the present invention is presented largely in terms of procedures, steps, logic blocks, processing, or other symbolic representations that directly or indirectly resemble the operations of devices or systems contemplated in the present invention. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in flowcharts or process diagrams or the use of sequence numbers representing one or more embodiments of the invention do not inherently indicate any particular order nor imply any limitations in the invention.

Figure 1:
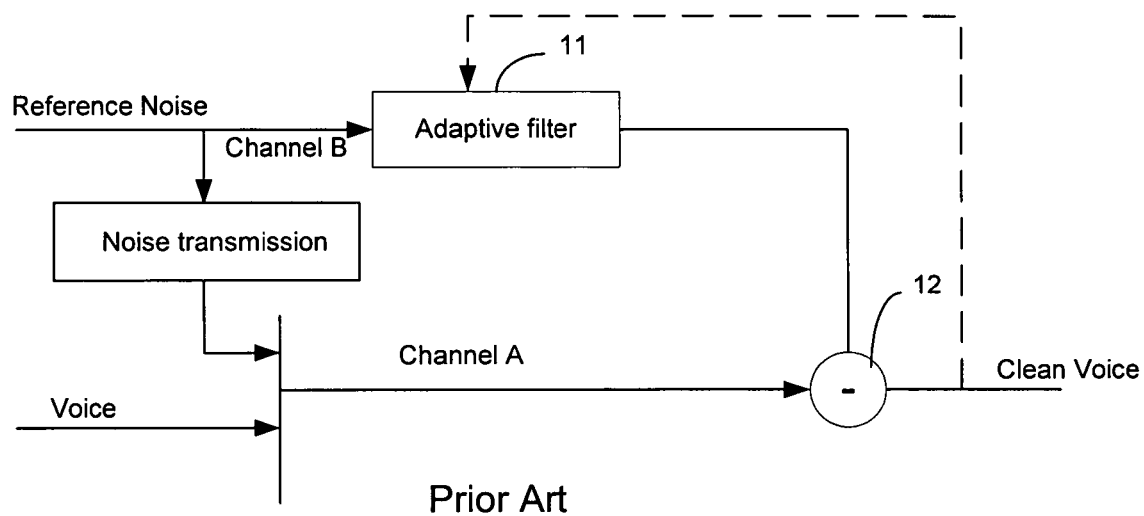
FIG. 1 is a block diagram of a conventional system for eliminating noise mixed in voice via an adaptive filter.
Figure 2:
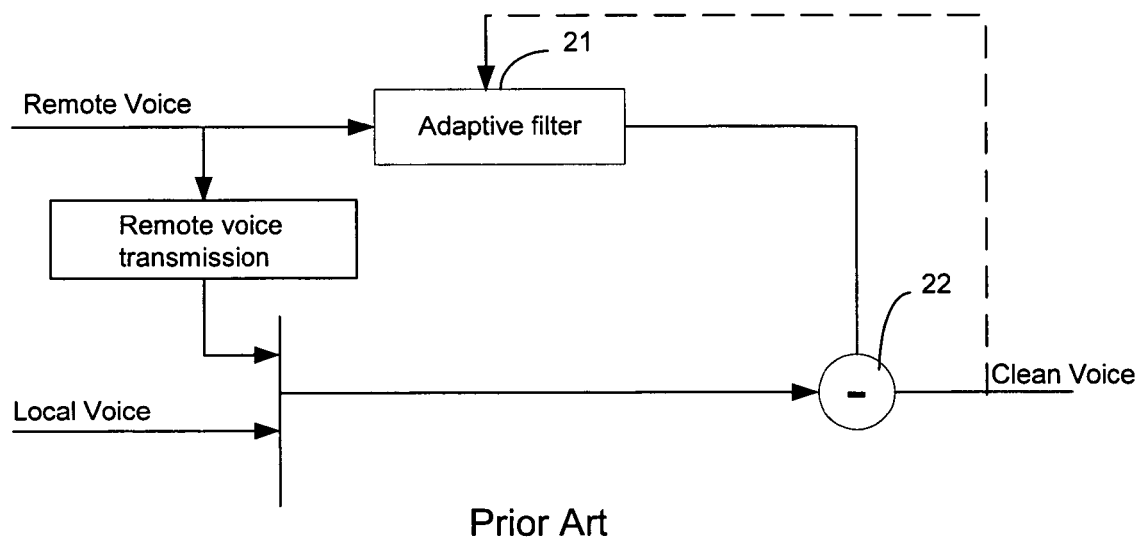
FIG. 2 is a block diagram of another conventional system for eliminating echo mixed in voice via an adaptive filter.
Figure 3:
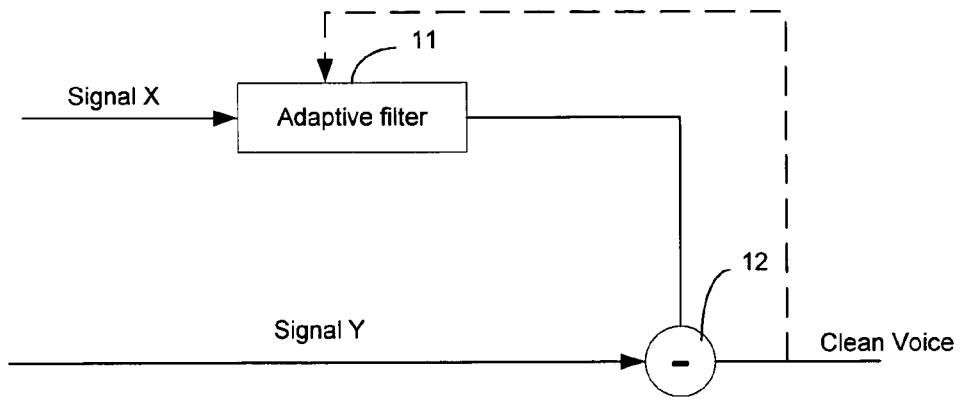
FIG. 3 is a simplified block diagram for LMS adaptive filter algorithm.
Figure 4:
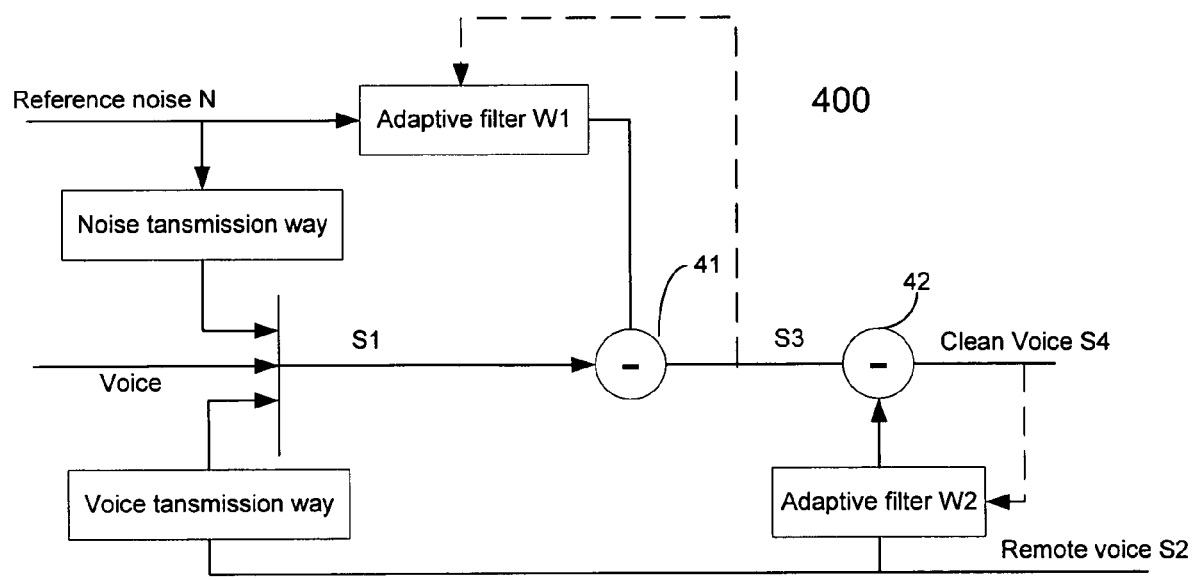
FIG. 4 is a simplified block diagram of a system for simultaneously eliminating echo and noise mixed in voice via adaptive filters, according to one embodiment of the present invention.
Figure 5:
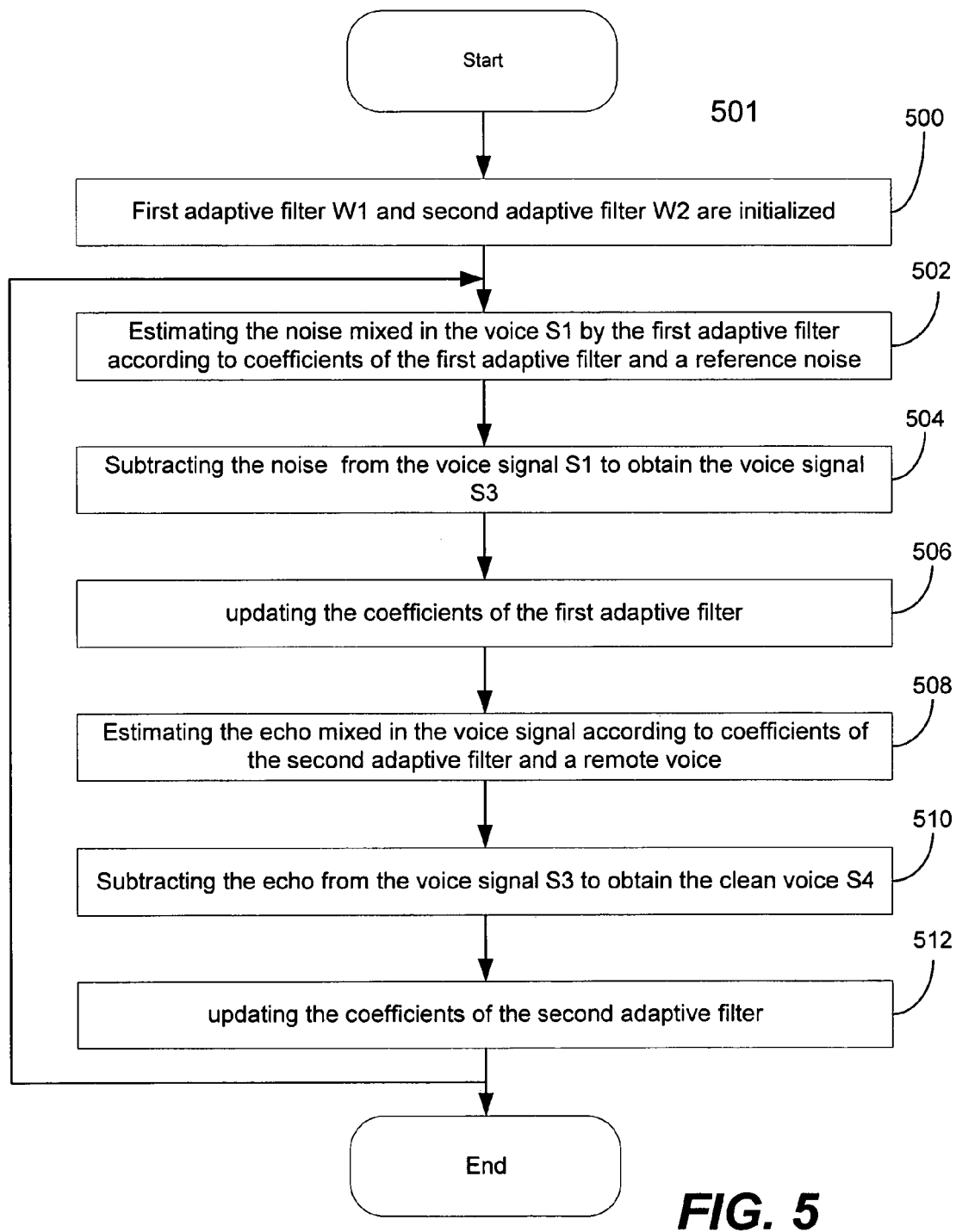
FIG. 5 is a flowchart of simultaneously eliminating echo and noise mixed in voice via adaptive filters.
Figure 6:
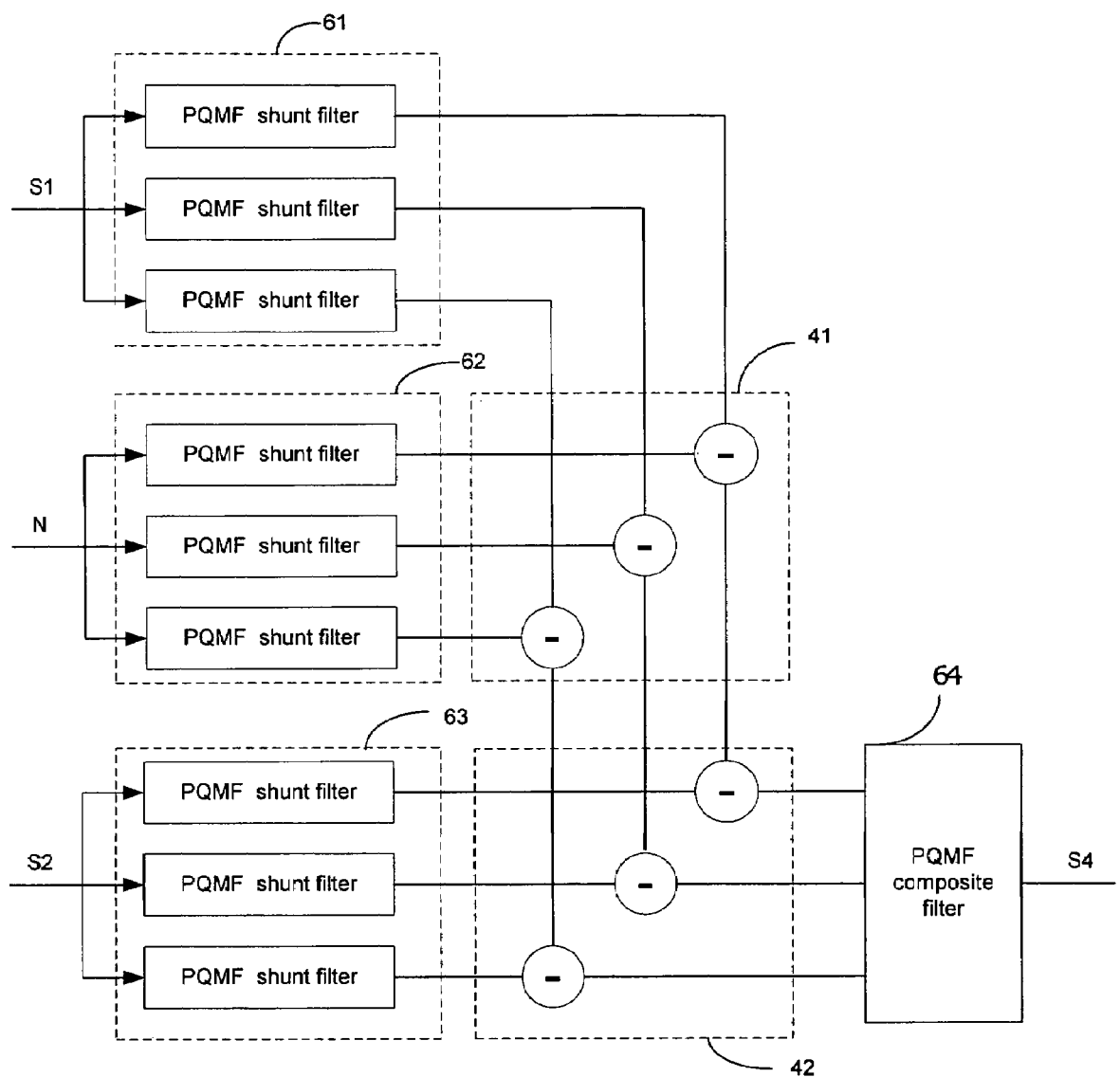
FIG. 6 is a schematic diagram of an adaptive filter system that adapts sub-band algorithm.

Embodiments of the present invention are discussed herein with reference to FIGS. 4-6. However, those skilled in the art will readily appreciate that the detailed description given herein with respect to these figures is for explanatory purposes as the invention extends beyond these limited embodiments. FIG. 4 is a simplified block diagram of a system 400 in accordance with one embodiment of the present invention for simultaneously eliminating echo and noise mixed in a voice signal via adaptive filters. The system 400 may be advantageously used in a real-time teleconference or similar situations.

Referring to FIG. 4, the adaptive filter system includes a first adaptive filter W1, a second adaptive filter W2, a first subtractor 41 and a second subtractor 42. In general, the adaptive filter W1 is provided to estimate the noise mixed in the voice signal S1 which has the mixed noise and echo according to a reference noise N. The first subtractor 41 is provided to subtract the noise estimated by the first adaptive filter W1 from the voice signal S1 to obtain the voice signal S3, which has no noise but till has the echo mixed therein. The adaptive filter W2 is provided to estimate the echo mixed in the voice signal S3, according to a remote voice signal S2. The second subtractor 42 is provided to subtract the echo estimated by the adaptive filter W2 from the voice signal S3 to obtain the clean voice signal S4.

In operation, as shown in FIG. 4, the remote voice signal S2 is transmitted in a local environment after it is played via a local sound box (e.g., one or more speakers) to come into being echo thereof. It is assumed that there are two microphones A and B at a local room. The microphone A is relatively closer to the (local) speaker, and the microphone B is relatively closer to the background sound source which serves as a noise source. When placing the microphones, the microphone A is preferably placed close to the local speaker while the microphone B shall be far from the local speaker but close to the background sound source. The microphone B records the background sound to form the reference noise N. When the microphone A records the local speaker's voice, it simultaneously records noise from the reference noise after it passes through a noise transmission path or way (NW) and the echo from the remote voice signal S2 after it passes through a voice transmission path (AW) to obtain the voice signal S1 mixed with the noise and the echo.

Because the microphone B is closer to the background noise source, and the noise reaches the microphone B first, so the noise in the voice signal S1 is not only lingering with the reference noise N, but also weaker than that. The purpose of the estimation of the adaptive filter W1 according to the reference noise N is to estimate the influence of the noise transmission NW to the reference noise N, so that the real noise in the voice signal S1 is estimated. The first subtractor 41 is provided to subtract the noise estimated by the first adaptive filter W1 from the voice signal S1 to obtain the voice signal S3, which has no noise but till has the echo mixed therein. The purpose of the estimation of the adaptive filter W2 according to the remote voice signal S2 is to estimate the influence of the echo transmission way AW to the remote voice signal S2, so that the real echo in the voice signal S3 can be estimated. The second subtractor 42 is adapted to subtract the echo estimated by the adaptive filter W2 from the voice signal S3 to obtain a clean voice signal S4.

FIG. 5 is a flowchart or process 501 showing simultaneously eliminating echo and noise mixed in voice according to one embodiment of the present invention. The process 501 may be readily understood in conjunction with FIG. 4. According to one embodiment, an improved time domain NLMS algorithm is used. The order numbers of the adaptive filters W1 and W2 is designated as N1 and N2, respectively. The N1 is bounded by the interval N1ϵ[32,256] and the N2 is bounded by the interval N2ϵ [512,4096].

The process 501 begins at 500, where the first adaptive filter W1 and the second adaptive filter W2 are initialized. The process 501 goes to 502, where the first adaptive filter W1 estimates the noise vector ew1[n] mixed in the voice vector S1[n] at n (time domain) according to the following formula:

$$ew1[n] = \sum_{i=0}^{N1-1} W1[n][i] * N[n-i] \qquad (2)$$

where W1[n][i] indicates i-order coefficient of the first adaptive filter W1 at n, and N[n−i] indicates the reference noise vector at n−1. Subsequently, it can be obtained that the voice signal S3[n] with the noise eliminated according to the following formula at 504:

$$S3[n]=S1[n]-ew1[n] \qquad (3)$$

Then, the process 501 goes to 506, where W1[n+1][i] is calculated, which indicates the i-order coefficient of the first adaptive filter W1 at n+1. In one embodiment, the updated step size ϵ(n) of the first adaptive filter W1 is calculated according to the following formula (4).

$$\varepsilon(n) = \frac{\varepsilon}{\delta + N1\sigma_{S1}^2[n]} \qquad (4)$$

wherein $\sigma_{S1}^2[n]$ is an estimated value of the short time energy and obtained from formula (5) or (6); $0<\epsilon<2$; δ is a positive value and usually at the same order of magnitude with ϵ;

$$\sigma_{S1}^2[n] = (1-\beta)\sigma_{S1}^2[n-1] + \beta S1^2[n] \qquad (5)$$

$$\sigma_{S1}^2[n] = \frac{1}{N1}\sum_{i=0}^{N1-1} S1^2[n-i] = \sigma_{S1}^2[n] + \frac{1}{N1}(S1^2[n] - S1^2[n-N1]) \qquad (6)$$

wherein β is a constant between 0 to 1, usually it is $$\beta = \frac{1.0}{N1}.$$

According to the updated step size ϵ(n) of the first adaptive filter W1, W1[n+1][i] can be calculated according to the formular (7), $$W1[n+1][i]=W1[n][i]+\epsilon[n]S3[n]N[n-i] \qquad (7)$$

The process 502 goes onto 508, where the second adaptive filter W2 estimates the echo vector ew2[n] mixed in the voice S3[n] at n according to the following formula:

$$ew2[n] = \sum_{i=0}^{N2-1} W2[n][i] * S2[n-i] \qquad (8)$$

wherein W2[n][i] indicates the i-order coefficient of the second adaptive filter W2 at n, S2[n−i] indicates the remote voice vector S2 at n−1. Subsequently, the voice signal S4[n] can be obtained at 510 with the echo eliminated according to the following formula:

$$S4[n]=S3[n]-ew2[n] \qquad (9)$$

At 512, similar to the formulas (4), (5) and (6), the step size $\epsilon_2(n)$ of the second adaptive filter W2 can be calculated, wherein the noise eliminated signal S3[n] replace the signal S1[n] in the formula (5) or (6), N1 is replaced by the N2 of the second adaptive filter. At this operation, according to the updated step size $\epsilon_2(n)$ of the second adaptive filter W2, W1[n+1][i] can be calculated according to the following formula, $$W2[n+1][i]=W2[n][i]+\epsilon[n]S4[n]S2[n-i] \qquad (10)$$

Subsequently the process 501 determines if the input voice signal S1 ends. If so, the process 501 exits, otherwise, the process 501 cycles at n+1 till the input voice signal S1 ends.

In one embodiment, the sub-band algorithm is adapted in the adaptive filter system and method of the present invention. The sub-band algorithm can reduce the computation cost by reducing the order number of the adaptive filter and accelerate the convergence rate of the adaptive filter. A time domain input signal is divided into many sub-band signals by a PQMF (Pseudo Quadrature Mirror Filter) shunt filter group. Due to the narrow frequency band of each sub-band signal, it can reduce the data rate by decreasing the sampling frequency, meanwhile, the order numbers of the adaptive filter can be reduced accordingly. After filtering each sub-band signal by the adaptive filter, the sub-band signals are synthesized into a time domain output signal.

Depending on implementation, there are two means for reducing the sampling frequency. One is threshold sampling, namely the number of the down-sampling element equals to the number of the analysis filter in the analysis filter group. The other one is oversampling, namely, the number of the down-sampling element is less than the number of the analysis filter in the analysis filter group. Usually, the number of the down-sampling elements equals to a half of the number of the analysis filter in the analysis filter group, or less. The oversampling avoids the aliasing of each sub-band signal caused by the down-sampling and eliminating the crossing items, so it is advantageously used in the sub-band adaptive filter.

FIG. 6 shows a schematic diagram of an adaptive filter system that adapts the sub-band algorithm as described above. The first adaptive filter W1 and the second adaptive filter W2 are not shown in the diagram. Usually, the first adaptive filter W1 and the second adaptive filter W2 can simultaneously be configured to conduct processing on many sub-bands. The processing of each sub-band signal may be proceeded in accordance with the process shown in FIG. 5.

Before the voice signal S1 reaches the first subtractor 41, a first PQMF (Pseudo Quadrature Mirror Filter) shunt filter group 61 divides the voice signal S1 into m sub-bands, processes each sub-band by reducing the corresponding sampling frequency, and inputs the sub-bands into first subtractors 41, respectively.

Before the reference noise N reaches the first adaptive filter W1, a second PQMF shunt filter group 62 divides the reference noise N into m sub-bands, processes each sub-band by reducing the corresponding sampling frequency, and then input the sub-bands into the first adaptive filter W1 (not shown), respectively.

Before the remote voice signal S2 enters into the second adaptive filter W2, a third PQMF analysis filter 63 divides the remote voice signal S2 into m sub-bands, processes each sub-band by reducing sample frequency, and then input the sub-channels into the second adaptive filter W2, respectively.

After outputting from the second subtractor 42, the PQMF composite filter 64 synthesizes the m sub-band voice signals from the second subtractor 42 to form the clean voice signal S4. Moreover, the first subtractor 41 includes m subtractors, each subtracting the sub-band noise estimated by the first adaptive filter W1 from the corresponding sub-band voice from the first PQMF analysis filter 61, namely, subtracting the i sub-band noise from the i sub-band voice signal, i[0, m−1].

Similarly, the second subtractor 42 includes m subtractors each subtracting the sub-band echo estimated by the second adaptive filter W2 from corresponding sub-band voice from the second PQMF analysis filter 62, namely, subtracting the i sub-band echo from the i sub-band voice signal, i∈[0, m−1].

The voice signal processing mode of each sub-band of the adaptive filter system is substantially similar to the process of FIG. 5. The voice signal processing of each sub-band is carried out according operations 500-512 without considing the PQMF shunt filter group 61, 62, 63 and PQMF composite filter 64.

If the PQMF composite filter 64 adopts the composite filter used in MPEG1 LayerIII standard (ISO 11172-3) (total 32 sub-bands, the down-sampling element is 16), the signal processing mainly includes:

(1) setting time domain for all bands. The order number of the first adaptive filter W1 and second adaptive filter W2 is respectively Ln and Le, of which, the Ln is generally between 32 and 512, the Le is generally between 512 and 4096;

(2) setting the order number of each sub-band noise elimination filter in the first adaptive filter W1 and the order number of each sub-band echo elimination filter in the second adaptive filter W2. The order number of each sub-band noise elimination filter in the first adaptive filter W1 is Ln/16+32, the order number of each sub-band echo elimination filter in the second adaptive filter W2 is Le/16+32, the coefficient initialization for each sub-band noise/echo elimination filter is zero.

(3) analyzing, filtering and down-sampling the voice signal S1, the reference noise N, and the speaker's voice signal S2, and getting the $S1_i, N_i, S2_i, 0 \leq i < 32$ of each sub-band signal.

(4) carrying out the adaptive filer operation on each sub-band signal $S1_i, N_i, S2_i$ according to the above formulas and conducting corresponding second adaptive filter W2 processing on each sub-band echo elimination filter; and (5) obtaining the clean voice signal S4 by sampling each subband signal and accumulating the samples subband signals.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

What is claimed is:

1. An adaptive filter system for eliminating noise and echo mixed in voice signal, the system comprising:

a first signal adaptive filter estimating the noise in the voice signal according to a reference noise;

a first subtractor subtracting the noise estimated by the first adaptive filter from the voice signal to obtain the voice signal without the noise, wherein an order of the first adaptive filter is bounded by a first interval N1, the first adaptive filter estimates a noise vector ew1[n] mixed in the voice signal represented as a voice vector S1[n] at n (time domain) according to a first formula:

$$ew1[n] = \sum_{i=0}^{N1-1} W1[n][i] * N[n-i],$$

where W1[n][i] indicates i-order coefficient of the first adaptive filter at time interval n, and N[n−i] indicates the reference noise expressed as a reference noise vector at n−i, subsequently, the voice signal without the noise expressed as S3[n] is obtained according to a second formula of:

$$S3[n] = S1[n] - ew1[n]$$

where S1 is the voice signal, an undated step size ε(n) of the first adaptive filter is calculated according to a third formula of:

$$\varepsilon(n) = \frac{\varepsilon}{\delta + N1\sigma_{S1}^2[n]}$$

where $\sigma_{S1}^2[n]$ is an estimated value of short time energy and obtained from either one of:

$$\sigma_{S1}^2[n] = (1-\beta)\sigma_{S1}^2[n-1] + \beta S1^2[n]; \text{ or}$$

$$\sigma_{S1}^2[n] = \frac{1}{N1}\sum_{i=0}^{N1-1} S1^2[n-i] = \sigma_{S1}^2[n] + \frac{1}{N1}(S1^2[n] - S1^2[n-N1]);$$

where 0<ε<2, δ is a positive value and in an order of magnitude with ε, β is a constant between 0 to 1;

a second adaptive filter estimating the echo in the voice signal according to a remote voice signal, wherein an order of the second adaptive filter is bounded by a second interval; and a second subtractor subtracting the echo estimated by the second adaptive filter from the voice signal without the noise to produce a clean voice signal.

2. The adaptive filter system as claimed in claim 1, wherein the first adaptive filter is designed to estimate an influence of noise transmission to the reference noise so that the noise in the voice signal is properly estimated, and wherein the second adaptive filter is designed to estimate an influence of echo transmission to a remote voice signal so that the echo in the voice signal is properly estimated.

3. The adaptive filter system as claimed in claim 1, wherein in estimating the noise in the voice signal, coefficients of the first adaptive filter are adaptively updated.

4. The adaptive filter system as claimed in claim 3, wherein the coefficients of the first adaptive filter are updated according to the voice signal without mixed noise and a step size of the first adaptive filter.

5. The adaptive filter system as claimed in claim 1, wherein in estimating the echo in the voice signal, coefficients of the second adaptive filter are adaptively updated.

6. The adaptive filter system as claimed in claim 5, wherein the coefficients of the second adaptive filter are updated according to the clean voice signal and a step size of the second adaptive filter.

7. The adaptive filter system as claimed in claim 1, wherein the voice with the mixed noise and echo is split into plural sub-bands, and wherein adaptive filter system eliminates the echo and the noise in the sub-bands of the voice respectively.

8. A method for eliminating echo and noise mixed in voice signal, the method comprising:
   estimating, by a first adaptive filter, the noise in the voice signal according to coefficients of the first adaptive filter and a reference noise;
   subtracting the noise estimated by the first adaptive filter from the voice signal to obtain a processed voice signal with the noise removed;
   updating the coefficients of the first adaptive filter in accordance with the processed voice signal;
   estimating, by a second adaptive filter, the echo in the voice signal according to coefficients of the second adaptive filter and a remote voice;
   subtracting the echo estimated by the second adaptive filter from the processed voice signal to obtain a clean voice; and
   updating the coefficients of the second adaptive filter in accordance with the clean voice, wherein an order of the first adaptive filter is bounded by a first interval N1, the first adaptive filter estimates a noise vector ew1[n] mixed in the voice signal represented as a voice vector S1[n] at n (time domain) according to a first formula:

$$ew1[n] = \sum_{i=0}^{N1-1} W1[n][i] * N[n-i],$$

where W1[n][i] indicates i-order coefficient of the first adaptive filter at time interval n, and N[n−i] indicates the reference noise expressed as a reference noise vector at n−i, subsequently, the voice signal without the noise expressed as S3[n] is obtained according to a second formula of:

$$S3[n]=S1[n]-ew1[n]$$

where S1 is the voice signal, an undated step size $\epsilon(n)$ of the first adaptive filter is calculated according to a third formula of:

$$\varepsilon(n) = \frac{\varepsilon}{\delta + N1\sigma_{S1}^2[n]}$$

where $\sigma_{S1}^2[n]$ is an estimated value of short time energy and obtained from either one of:

$$\sigma_{S1}^2[n] = (1-\beta)\sigma_{S1}^2[n-1] + \beta S1^2[n]; \text{ or}$$

$$\sigma_{S1}^2[n] = \frac{1}{N1}\sum_{i=0}^{N1-1} S1^2[n-i] = \sigma_{S1}^2[n] + \frac{1}{N1}(S1^2[n] - S1^2[n-N1]);$$

where $0<\epsilon<2$, $\delta$ is a positive value and usually in an order of magnitude with $\epsilon$, $\beta$ is a constant between 0 to 1.

9. The method as claimed in claim 8, wherein the updating of the coefficients of the first adaptive filter is performed according to the processed voice signal and a step size of the first adaptive filter.

10. The method as claimed in claim 8, wherein the updating of the coefficients of the second adaptive filter is performed according to the clean voice signal and a step size of the second adaptive filter.

11. The method as claimed in claim 8, further comprising:
   splitting the voice signal with the mixed noise and echo into a plurality of sub-band signals; and
   processing the sub-band signals, respectively; and
   grouping the processed sub-band signals.

* * * * *